United States Patent [19]

Damp

[11] Patent Number: 4,839,942
[45] Date of Patent: Jun. 20, 1989

[54] FISH SCALING APPARATUS

[76] Inventor: James B. Damp, P.O. Box 167, Abrams, Wis. 54101

[21] Appl. No.: 144,235

[22] Filed: Jan. 15, 1988

[51] Int. Cl.$^4$ ............................................. A22C 25/02
[52] U.S. Cl. ............................................................ 17/64
[58] Field of Search ................................. 17/64, 65, 51

[56] References Cited

U.S. PATENT DOCUMENTS

| | | | |
|---|---|---|---|
| 1,064,558 | 6/1913 | Smith et al. | |
| 1,383,162 | 6/1921 | Sprague | 17/64 |
| 2,058,560 | 10/1936 | Brandstrom | 127/23 |
| 2,860,371 | 11/1958 | Krull | 17/5 |
| 3,071,801 | 1/1963 | Scheiding | 17/65 |
| 3,766,605 | 10/1973 | Burns | 17/64 |
| 4,324,020 | 4/1982 | Garwin et al. | 17/65 X |
| 4,485,526 | 12/1984 | Opanasenko | 17/64 |
| 4,724,095 | 2/1988 | Bissell, Jr. et al. | 17/64 |

FOREIGN PATENT DOCUMENTS

| | | | |
|---|---|---|---|
| 437620 | 11/1926 | Fed. Rep. of Germany | 17/64 |
| 643383 | 5/1928 | France | 17/65 |
| 128847 | 7/1919 | United Kingdom | 17/65 |

*Primary Examiner*—Willie G. Abercrombie
*Attorney, Agent, or Firm*—Andrus, Sceales, Starke & Sawall

[57] ABSTRACT

A portable fish scaler includes an open top tank with a drum unit rotably mounted to the top of the end walls. A motor is directly coupled to drive the drum, either with a small AC motor having an integrated gear reducer or a small 12 volt DC motor directly coupled to the shaft to slowly rotate the drum. Bearing support units on the end walls permit the drum shaft to be directly inserted and removed. One bearing is a U-shaped block of a low friction plastic and the other is a telescopic plastic bearing. The drum shaft rests in the U-shaped bearing and telescopes into the coupling bearing. The drum is formed from a flat plate which has inward scaling projections formed by punching the metal to form each projection with a jagged inner edge. The plate is rolled to form a cylinder. A smaller second drum floats on the first drum shaft. The second drum has outward scaling projections and may be formed from two flat plates secured back-to-back and with the centers curved outwardly. The projections in the outer drum are formed in different groups, one of which has larger diameter openings for removal of larger scales. A small inner drum with cleaning projections floats on the shaft to further remove scales.

18 Claims, 2 Drawing Sheets

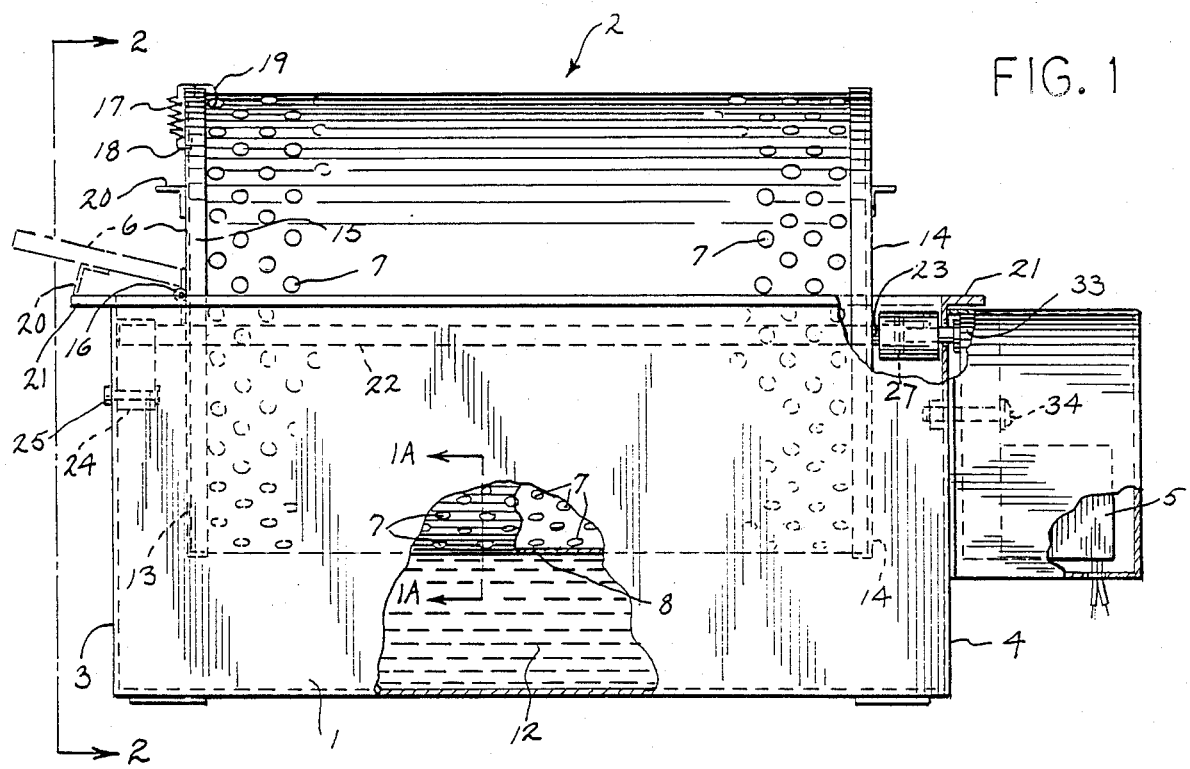
FIG. 1
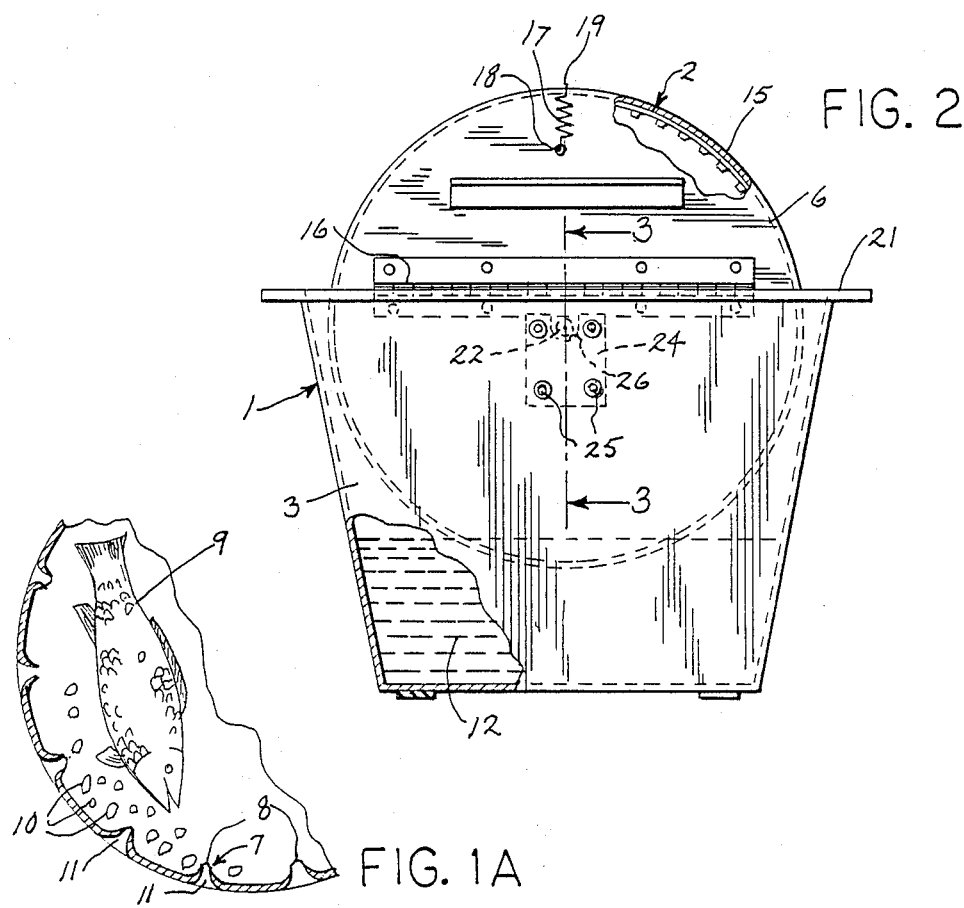
FIG. 2
FIG. 1A

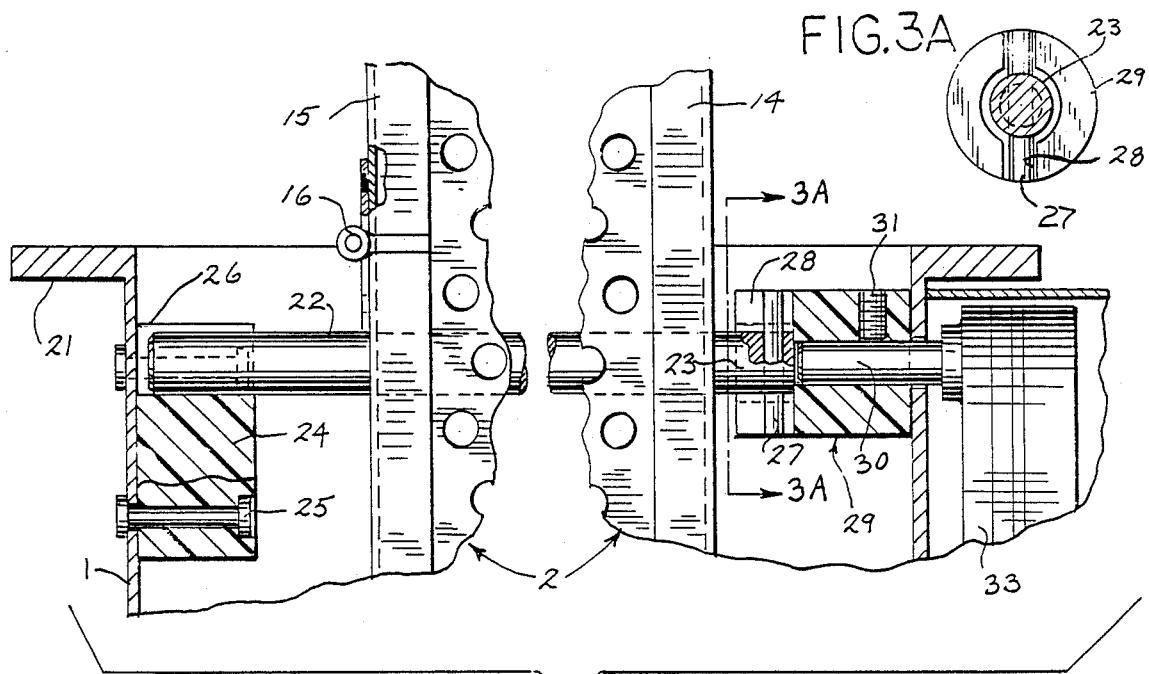
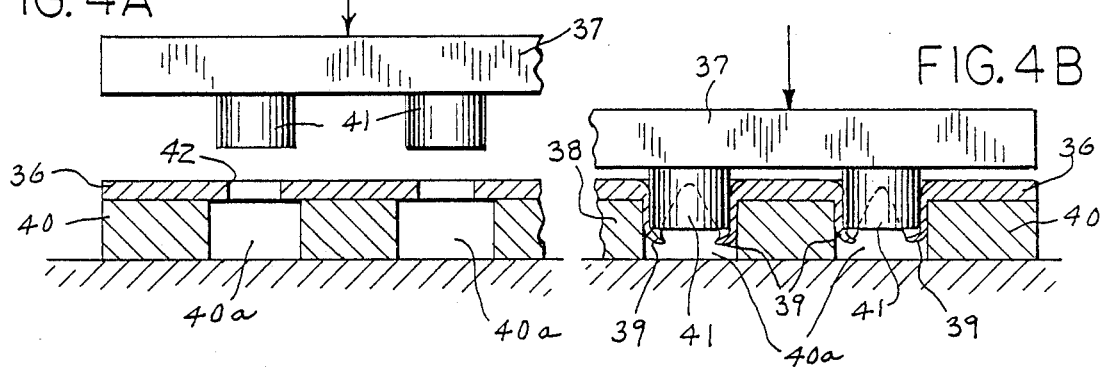
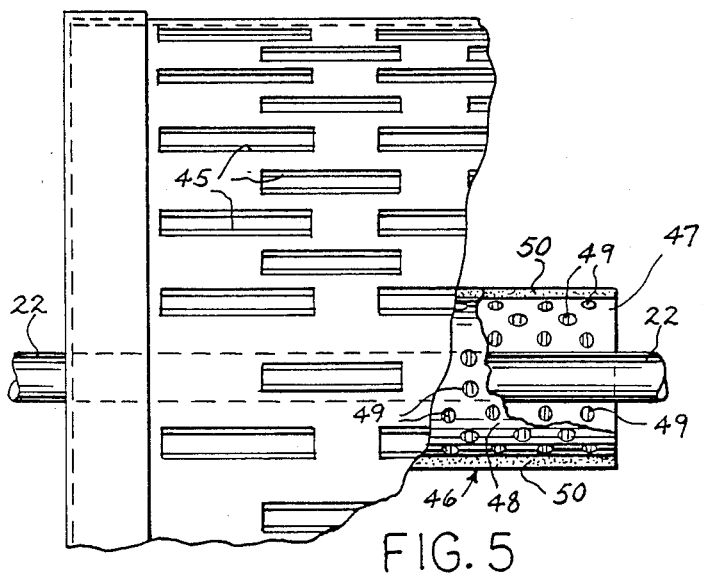
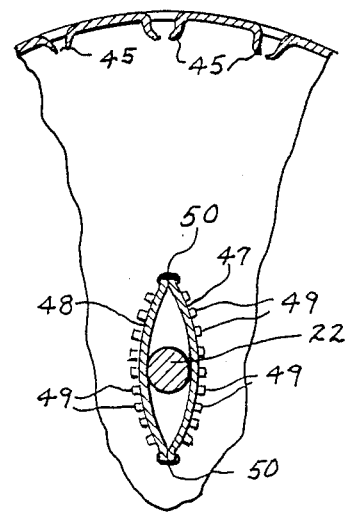

FISH SCALING APPARATUS

BACKGROUND OF THE PRESENT INVENTION

This invention relates to a fish scaling apparatus and particularly to a portable fish scaling apparatus which can be conveniently stored and removed whenever a plurality of game fish are to be cleaned.

Many people enjoy fishing as a sport in contrast to commercial fishing. Inland lake fishing as well as large fresh water lake fishing and ocean fishing results in catching a substantial number of relatively small fish. Some of the fish of courset particularly on large inland lakes may reach sizes of many pounds. Generally, the average sports fisherman catches somewhat smaller fish in somewhat greater numbers. The individual sport fisherman has always been faced with the rather unpleasant task of cleaning the fish, and particularly the removing of the fish scales prior to preparation of the fish for eating. Various hand manipulated fish scaling devices have been developed and are widely used. The simple manual scraping device is generally less than totally acceptable. Although, motorized devices have been suggested, they too have not found wide usage and acceptance. Various larger power driven fish scaling apparatus has been suggested. For example, U.S. Pat. No. 3,766,605 which issued on Oct. 23, 1973, discloses a drum member mounted within another enclosure member. An electric motor pulley drive system is coupled to the inner drum to rotate the drum within a water bath. The peripheral wall of the drum includes an opening, with a door closure, for introducing of a number of small game fish into the inner drum. Rotation of the drum results in scaling of the fish. U.S. Pat. No. 4,485,526 which issued on Dec. 4, 1984 discloses a similar device with a drum having a plurality of projecting scaling members which are set to more effectively move the fish and affect the removal of the scales. A vertically oriented drum with a bottom motor drive for fish cleaning is illustrated in U.S. Pat. No. 2,860,371 which issued on Nov. 18, 1958. In this device, a drum, much in the nature of a vertically oriented wash machine drum, is provided with inward projections formed on radially inward projecting curved portions. The projections are specially formed and may include inward punctured openings defining the inwardly projecting scaling protrusion. The above and other fish scaling devices have been suggested.

Other devices have been suggested for scrubbing of other products such as potatoes, which involves a rotating drum mounted within a water or liquid cleaning trough. These and other structures are more fully discussed and shown in various U. S. Patents such as the following:

| U.S. Pat. No. | Issued Date | Inventor |
| --- | --- | --- |
| 1,064,558 | 06-10-1913 | Smith |
| 2,058,560 | 10-27-1936 | Brandstrom |
| 2,860,371 | 11-18-1958 | Krull |
| 3,766,605 | 10-23-1973 | Bruns |
| 4,485,526 | 12-04-1984 | Opanasenko |

Generally, the prior art devices appear to provide for relatively large in place devices. Thus once mounted, the devices are in place and the fish must be brought to the apparatus. Further, the inventor of the present invention is of the opinion that in addition to the lack of portability, the drive and drum structures would not appear to provide a highly effective, efficient and low cost fish scaling apparatus particularly with fish of different sizes and weights. The average sports fisherman often has limited financial resources and cannot afford a relatively expensive cleaning apparatus, particularly if the cleaning results are not totally satisfactory.

There remains therefore a rather distinct need for an effective but relatively inexpensive fish scaling apparatus which can be readily moved by the user not only with respect to storage but also is in completely different locations, for example, transport by the fisherman from each fishing site adjacent to the next fishing site and the like.

SUMMARY OF THE PRESENT INVENTION

The present invention is particularly directed to a drum fish scaling apparatus which is highly portable and constructed as a relatively inexpensive, efficient and safe device. Generally in accordance with the teaching of the present invention, the fish scaling apparatus includes a lower open top tank adapted to contain a body of water. A fish scaler drum unit is releasably coupled to the upper end of the tank end walls. A specially selected motor is directly coupled to drive the drum. The motor is a small AC motor with an integrated gear reducer or alternatively a small DC motor which is directly coupled to the drum and can be directly operated from a 12 volt battery or the like of a conventional automobile.

The drum is specially constructed with an outer continuous metal wall. The drum is preferably specially punched from a flat plate to develop a plurality of inwardly projecting annular cleaning projections. The edges of the openings are formed as a continuous edge to define a relatively fine multiple edged cleaning edge. The punched plate is rolled to form a cylinder.

A shaft is secured to the drum and releasably mounted in the end walls of the tank. The shaft may be a single continuous shaft member projecting and sealed to appropriate openings in the end wall, or separate shafts may be secured to each end wall. The tank end walls are provided with special bearing support units, such that the drum can be directly inserted into the tank with the shafts resting in the support units, which may conveniently be a simple U-shaped bearing members formed of a suitable low friction plastic and a corresponding telescopic bearing member. The shaft located in the plastic bearing provides a satisfactory and long life support in that the present invention as presently described uses a small motor drive operating at a relatively low speed to effectively rotate the drum during the cleaning or scaling function.

In one embodiment, the motor is an AC motor having gear reduction box integrated into the end of the motor. The motor is directly mounted to and drives the adjacent shaft coupling. A separate enclosure is preferably provided about the motor to isolate the motor and prevent accidental engagement with the motor. A heavy duty electric cable extends from the motor for plugging into a conventional 115 volt AC receptacle. In an alterante embodiment, a small DC is mounted directly to the shaft coupling and directly drives the shaft, and can be driven from the conventional vehicle 12 volt battery or the like. A small DC motor avoids all potential shock hazard. An electric cable to the DC motor preferably terminates in a small DC connector such as a cigarette lighter receptacle found in a vehicle or any other type of a DC connection. A small receptacle can be provided with the unit for mounting in the automobile and for fixed releasable connection to the battery in the event such a receptacle is not available in the users vehicle, or for use with a portable battery unit.

The drum and tank are preferably formed of a stainless steel, or like material to minimize and essentially eliminate problems of rust and the like. The drum with the integral projections is preferably formed of an appropriate weight metal. The tank structure may of course be readily formed of a suitable plastic with appropriate projections having the sharp inner edge.

Further, the present invention does not require a great body of water with the holding tank to flush the fish during the cleaning operation. The tank is preferably formed with inclined side walls so as to provide a relatively close but spaced relation with respect to the smooth outer wall of the scaling drum. Water is introduced into the bottom portion of the tank and fills the tank to move upwardly through the drum to approximately ¼ inch within the drum.

In operation, the drum rotates at an appropriate speed such as 25 RPM per minute. The special inward projections effectively removes the scales from the fish without damage to the body portion. Actual operation of the device constructed in accordance with the present invention has indicated limited damage to the non-edible portions such as the head or tail, but the fish body remains essentially in a firm and unbruised state. Further, there is essentially no danger to the user from the rotating drum. Thus, if for any reason the user should reach into the drum while it was rotating, the action is sufficiently smooth and gentle as to avoid any effective damage or harm to the user.

The fish scaling apparatus of this invention is thus specially designed to minimize any possible danger to the user and eliminate all safety hazards while simultaneously producing a relatively low cost, long lasting, efficient and effective fish scaling apparatus which is highly portable.

The water tank is preferably formed as a continuous walled member without any special drain or the like. Thus, the user can quickly, readily and conveniently remove the drum from the tank, and the tank is tipped to remove the water or to add water. This eliminates the necessity of any valving or the like and permits a low cost manufacture of a tank which provides effective and efficient cleaning and removal of any fish scales. This also substantially eliminates special recesses within the drum within which fish matter might be caught retained in the fish scaling operation and which could quickly and readily create a highly offensive smelling structure.

Although the number of drum openings is not particularly critical, in a drum having a length of approximately 18 inches and a drum periphery of a 12 inch diameter, approximately 1,000 holes were formed in the drum.

In a preferred embodiment of the present invention, the openings are formed in different groups including at least two different groups. The one group of openings is formed with substantially larger diameter openings or projections than the other group and generally of a lesser number of total openings. The larger openings are desirable to promote the efficient and ready removal of larger sized scale from the drum. In a preferred embodiment, the larger openings encompassed approximately 5 per cent of the drum circumference.

The present invention has been found to provide an effective, efficient and low cost fish scaling apparatus.

BRIEF DESCRIPTION OF DRAWINGS

The drawings furnished herewith illustrate a best mode presently contemplated for the invention and are described hereinafter.

In the drawings:

FIG. 1 is a front elevational view of a fish scaling apparatus constructed in accordance with the teaching of the present invention and with parts broken away to disclose detail of construction;

FIG. 1A is a fragmentary view taken generally on line 1A—1A of FIG. 1;

FIG. 2 is an end view of the fish scaling apparatus shown in FIG. 1 with parts broken away and sectioned to show certain detail of construction;

FIG. 3 is a fragmentary vertical longitudinal section taken generally on line 3—3 of FIG. 2;

FIG. 3A is a view taken on line 3A—3A of FIG. 3;

FIG. 4A is a view showing an initial step in forming of a drum;

FIG. 4B is a view similar to FIG. 4A showing a further step in the forming process; and FIG. 5 is a fragmentary view of an alternate embodiment.

FIG. 5A is a fragmentary end view of the embodiment of FIG. 5.

DESCRIPTION OF THE ILLUSTRATED EMBODIMENT

Referring to the drawings and particularly to FIGS. 1 and 2, a fish scaling apparatus is illustrated including an open top tank 1 with a fish scaling drum unit 2 rotatably mounted at the opposite ends in the opposite end walls 3 an 4 of the tank 1. A motor unit 5 is secured to the end wall 4 of the drum unit 2 and is operable to rotate the drum 2 for removing of fish scales. The end wall 3 opposite the motor unit 5 is provided with a releasable cover 6 for introducing and removing of fish from within the drum. As more fully developed and generally shown in FIGS. 1 and 3, the user can lift the drum 2 from the tank 1 for easy access to the drum for insertion and removal of fish, as well as cleaning and maintenance. The drum is constructed with special inwardly located fish scaling tubular projections 7 and 7a, each having an inner edge 8 and which operate on the surface of the fish 9 to remove the fish scales 10. The removed fish scales 10 drop downwardly through the drum projection openings 11 into the bottom of the tank 1. The bottom of the tank 1 contains a small bath of water 12 which has a depth which just covers the lower end portion of the drum.

The water tank can be formed of a suitable stainless steel or the like. Alternately, it can be formed as a molded plastic tank such as polypropylene.

The drum projections 7 and 7a as illustrated and more fully developed hereinafter are specially constructed and formed as integral generally tubular projections projecting inwardly from a smooth outer wall unit. The inner edge 8 of each projection defines a relatively fine jagged scaling edge in generally orange peal broken shape for gentle but effective rubbing of the surface of the fish to effectively and thoroughly remove the scales without damaging the body of the fish including the skin.

Thus, in operation, the user opens door 6 to introduce the fish, the fish are introduced while the drum is in place within the tank. If water 12 was not supplied to the tank previously, water is supplied after insetion of the fish. The motor 5 is then energized to continuously slowly rotate the drum, at a speed for crample of 25 RPM. Depending upon the particular loading of the drum, the fish are rapidly and thoroughly cleaned. Having completed the scaling cycle, the scales which have been removed from the fish pass through the openings including the larger openings 7a and settle at the bottom of the tank during operation.

Although the fish can be removed with the drum 2 in place, the drum 2 can be conveniently removed for emptying of the drum of the cleaned fish as well as putting further fish in the drum. The drum can then be set up on end, the door or cover 6 opened and the fish removed.

The special scaling projections 8 as noted provide a gentle scrubbing action and the user may with safety put his arm into the drum to remove the fish 9. If for any reason, the motor should be accidently energized and the operator's hand or arm engage any of the projections, the action is such that there will be effectively no harm or hazard created.

In the illustrated embodiment of the invention, the projections 7 and 7a are formed in two different groups. The one group of projections 7a is formed with substantially larger diameter openings or projections than the other group 7 and generally of a lesser number of total projections. The larger openings in projections 7a are desirable to promote the efficient and ready removal of larger sized scale from the drum and generally encompass a small portion of the drum surface. For example, in a practical structure, 2 groups of openings 7a were used covering approximately 5 per cent of the dru. In the preferred embodiment, the smaller projections 7 thus encompass approximately 95 per cent of the drum circumference.

More particularly, the illustrated drum is a cylindrical drum which in one portable embodiment was formed with a length of 18 inches and a diameter of 12 inches. The end walls 13 and 14 are flat continuous or imperforate wall members. The end walls are secured to the opposite end of the cylindrical outer wall by tack welding. The end wall may also be secured by crimping the drum over the end wall or the like. The one end wall 13 is formed with the cover 6, shown as a flat plate covering slightly less than half of the end wall and having a lip 15 which projects over the edge of drum 2. A piano hinge 16 secures the chordal edge of the cover 6 to the end wall and a releasable latch 17 couples the outer edge of the cover in place.

The latch 17 is shown as a simple spring having one end secured to the cover as at 18 and the opposite end extended over the lip and attached to the drum 2 as at 19.

A handle member 20, shown as an elongated L-shaped channel, is secured to the cover 6 and located to engage the upper edge 21 of tank 1 with the cover open. The member 20 holds the cover at an appropriate angle for convenient introduction of fish into drum 2.

The drum 2 is a cylindrical drum having closed end walls 13 and 14. Drum 2 is supported at the opposite ends by support shafts 22 and 23 which project outwardly of the end walls. The shafts 22 and 23 may be formed as a single shaft member as shown projecting axially through the drum, as shown in FIG. 1.

The one shaft 22 opposite motor 5 is formed as a simple round shaft. In the assembled position, the shaft 22 rests in a bearing unit 24 secured to the inner wall of the water tank 1. As illustrated, the bearing unit 24 is a simple block having a U-shaped top opening 26 defining a supporting journal. The block is bolted as by bolts 25 or otherwise firmly secured to the tank wall with the U-shaped opening projecting upwardly. The diameter of the base of the U-shaped opening 26 corresponds to the diameter of the shaft.

The bearing is conveniently formed of a suitable plastic such as Teflon or other similar material having a low-co-efficient friction. The unit can then operate without the necessity of lubrication or the like.

The opposite end shaft 23 projects outwardly from the opposite end of the drum and is specially formed with a coupling pin 27 projecting diametrically from the shaft, as shown in FIGS. 3 and 3a. The pin 27 mates with a recess 28 in a rotating coupling unit 29. The motor shaft 30 is secured to the unit 29 by a setscrew 31 and supports the drum 2 for rotation.

The coupling 29 is shown as a small plastic coupling having a center opening with a pair of diametrically extended opening arms adapted to move over the shaft 30 for securement thereof. The lateral arms of the shaft and the corresponding opening arms of the coupling provide for rotational coupling of the shaft for direct rotation of the sahft from the motor.

The small drive motor 5 is secured to the exterior wall of the water tank wall, with motor shaft 30 extended through an appropriate opening in the tank wall. The motor 5 includes a gear reduction unit 33 with a mounting flange secured to the tank wall by a bolt 34.

Motor 5 may also be a suitable D.C. motor drive operating from a 12 volt supply such as a DATN AZ 839 12 volt gear motor with a cigarette lighter type plug-in unit. Such motor comes with a complete motor housing and can be directly mounted to the end wall without the necessity for an exterior separate housing.

In operation, the drum 2 is conveniently and rapidly inserted and removed from the water tank 1. In assembly, the driven shaft 23 is inserted into the coupler 29 and the opposite end of the drum dropped into the U-shaped bearing 24. To remove the drum, the unrestricted end 22 is moved upwardly out of the U-shaped bearing 24 permitting axial movement of the drum to release the shaft 23 from the coupling 29. This provides a very convenient reliable and effective drive while permitting the simple insertion and removal of the drum.

The drum and tank are preferably formed of a stainless steel, or like material to minimize and essentially eliminate problems of rust and the like. The drum with the integral projections is preferably formed of an appropriate weight metal. The tank structure may of course be readily formed of a suitable plastic with appropriate projections having the sharp inner edge.

Further, the present invention does not require a great body of water with the holding tank to flush the fish during the cleaning operation. The tank is preferably formed with inclined side walls so as to provide a relatively close but spaced relation with respect to the smooth outer wall of the scaling drum. Water is introduced into the bottom portion of the tank and fills the tank to move upwardly through the drum to approximately $\frac{1}{4}$ inch within the drum.

The holes or openings 7 may have an inner diameter of about $\frac{1}{8}$ inch and spaced on about $\frac{3}{8}$ inch centers. Larger openings 7a are formed of approximately $\frac{3}{8}$ inches in diameter. The openings 7a are spaced on approximately ¾ inches apart.

The drum was formed as described using a plate and punch and included a through shaft with the ends projecting outwardly. The shaft rested in a slotted plastic block at the one end wall and was coupled to the motor at the opposite end. The motor was directly mounted to the end wall. The motor was a small A.C. 1/60th horsepower gear drive motor with a full load current rating of 1.5 amps, and provided 21.50 inch pounds starting and running torque.

In a particular practical and unique embodiment, the drum 2 is formed from a flat metal drum plate 36, as shown in FIGS. 4A and 4B. The plate 36 is pierced by a punch member 37 to formed the plurality of distributed openings having the integral inwardly projecting walls 38. The inner edges 39 of the walls 38 define the scaling edge. In forming the protrusions, a punch backing plate 40 is formed with openings 40a slightly larger than the punches 41 and in a corresponding array. The drum plate 36 is formed with pierced openings 42 of a diameter slightly less than the diameter of the final openings of projections 7. The apertured drum plate 36 is clamped to the backing plate with the punch elements aligned with the several openings. The punch is forced through the drum plate to deform, extrude and break the inner projections. As the punches 41 move through the openings 42 in the drum plate, the metal is deformed and forced outwardly into the opening 40a in the backing plate while maintaining of the outer surface of the drum smooth and flat. The walls of the projections are generally broken to form two or more wall sections. In some projections, the walls have sections of a similar length while others have different lengths. Generally, all projections have rather sharp edges.

As the metal about the drum opening moves inwardly, the inner face or edge 39 is confined and held, thereby maintaining the inner edge in an essentially effective continuous member of a slightly reduced thickness. The punched drum plate 36 is then rolled into a cylinder with the projections 38 facing substantially radially inwardly. The opposed edges of the plate are secured to each other to form the outer drum wall. The edges can be joined in any suitable manner as by spot welding or even crimping, depending upon the particular weight of metal and the like. Opposite imperforate end walls are then secured to the ends of the drum wall. The end walls are formed of a metal sufficient to constitute an effective support of the drum with a multitude of fish dropped into the drum. The one end wall is provided with the movable cover defining the entrance opening for introducing and removing of the fish from the drum.

In a practical application, 29 inland-lake fish were introduced into the 18 inch drum. The water tank included water to cover approximately ¼ inch of the bottom of the drum. Depending upon the particular type of fish, the fish were completely scaled in no more than 15 minutes. The drum functions to pick up and carry the fish to the top of the drum from where the fish drop, with the drum acting to roll and turn the fish on the surface of the projections, thereby removing the scales. The drum also picks up water with the fish to effectively wash the body of the scaled fish.

The removed scales fall through the projection openings and settle in the bottom of the water tank during the cleaning operation.

Once the fish are cleaned, the drum 2 is conveniently removed by the handles. The fish of course are removed by opening of the cover and emptying the fish of the drum. This can be done by merely turning of the drum on its end with the cover opened whereby the fish will readily fall from the drum. If cleaning of all fish has been completed, the drum can then be rinsed off and the water tank emptied of its water.

The cleaning drum operates at a low speed with a high torque motor to avoid any possible damage to the operating personnel or others in the vicinity. The unit is readily formed of suitable materials to prevent rusting and the like and to maintain a long and effective operating life.

The described unit provides a practical portable unit. A larger portable unit may advantageously vary the particular shape or configuration of the tank or the like. Thus, the tank may be formed with added vertical top sidewalls extending from the inclined walls shown in the first embodiment. The end cover may also be less than half the total diameter of the end wall. These and other variations will be readily used, as desired.

In an alternate embodiment shown in FIG. 5, the drum 2 is formed with alternate openings and particularly as a slotted unit with the holes formed as an elongated slot 45 with corresponding cleaning projections. In a practical application, the drum was formed with slots of 3/16th inch wide and 1 inch long. The slots were spaced approximately ⅜ths of an inch apart.

In the further embodiment shown in FIG. 5, an inner small scaling unit 46 is secured over the drum shaft 22 and serves to further remove fish scales 10 as the fish fall from the upper portion of the drum. In the illustrated embodiment of FIG. 5, two similar perforated plates 47 and 48, having the scaling projections 49, are secured together. The smooth sides are welded back-to-back as at 50 with the central portion bowed outwardly to form a drum telescoped over the drive shaft to form the scaling unit 46. The unit 46 floats and moves freely on the shaft 22. As fish 9 drop and hit the projections of the plates, scales are removed which serves to significantly lower the scaling time. The plates 47 and 48 may be formed as shown in FIGS. 4A and 4B, mounted back-to-back with the outer longitudinal edges welded together. The center of the plates may be curved outwardly before or after welding.

The present invention thus provides a highly effective and reliable fish cleaning apparatus which can be conveniently formed as a small portable unit for on-site application.

Various modes of carrying out the invention are contemplated as being within the scope of the following claims particularly pointing out and distinctly claiming the subject matter which is regarded as the invention.

I claim:

1. A fish scaling apparatus for removal of scales from a fish without brusing the edible body portion comprising, a trough-shaped tank having a bottom and sidewall portions and first and second end walls secured to said bottom and sidewall portions, a substantially closed cylindrical scaling drum having a cylindrical wall and end closure walls, said cylindrical wall being formed of metal and having a plurality of openings including inwardly projecting sidewalls having smooth inner scaling edges for scaling of fish during rotation of the drum, a drive shaft means on said end closure walls, first and second bearing means secured to the end walls of said trough-shaped tank and said end closure walls of said cylindrical drum, each of said first and second bearing means includes a first bearing member secured to said trough-shaped tank and a second bearing member secured to said cylindrical tank, said first and second bearing members being releasably coupled to form a rotating bearing support of said cylindrical tank and permitting manual removal of said tank without removing components from said bearing members, and a motor means secured to one end wall of said trough-shaped tank and having an output shaft, and a releasable coupling direct connected to said output shaft and to said drive shaft means.

2. The fish scaling apparatus of claim 1 wherein said trough-shaped tank includes a flat bottom wall and flat sidewalls secured to said bottom wall and extending upwardly and laterally outwardly to define an open top having a width slightly greater than said cylindrical scaling tank, said tank being accessible only through said open top for addition and removal of water.

3. The fish scaling apparatus of claim 1 wherein said cylindrical wall has a plurality of enlarged openings interposed within said first named openings, said enlarged openings facilitating transfer of removed scales to said trough-shaped tank.

4. The fish scaling apparatus of claim 1 wherein said openings include first and second groups of openings, the first group of openings having a diameter of about ⅛ inch and the second group of openings having a diameter about three times the first group.

5. The fish scaling apparatus of claim 4 wherein the second group covers a substantially smaller area of the drum than said first group.

6. The apparatus of claim 1 wherein said first bearing member is a low friction plastic block having an upwardly opening bearing opening, said second bearing member being a shaft having a diameter corresponding to said bearing opening, said second bearing means including a coupling unit having a first member secured to the drum wall and a second member having an axial telescoped drive connection to said first member, said motor means being mounted to the tank and having a motor shaft extending through the end wall of the tank, said second member of said second bearing means being fixed to the shaft of said motor means.

7. The apparatus of claim 1 wherein said first and second bearing means are vertically offset and support said drum with an inclined axis of rotation.

8. The fish scaling apparatus of claim 1 wherein said drum includes a movable cover pivotally secured to one of said end closure walls, said cover having an external projection adapted to engage said tank and hold said cover in the opening position inclined toward the tank to define a slide for placing fish in said drum.

9. The apparatus of claim 1 wherein said motor means is a permanent magnet motor having a twelve volt input means.

10. The apparatus of claim 1 wherein said motor means rotates said drum at about twenty five revolutions per minute.

11. A portable fish scaling apparatus, comprising
a portable tank having a bottom wall and inclined sidewalls and opposite end walls defining an open-top tank unit, said walls of said tank being imperforate with entrance only through said open-top, said tank being adapted to be manually moved by an operator, a scaling drum having a diameter slightly less than the opening to said tank, said drum including a plurality of inward tubular projections distributed over the entire surface of the drum, each projection having an inner scale removing edge, each of said edge defined by jagged multiple walls having sharp edges, said drum having end walls confining the fish within the drum, said drum adpated to be manually moved by an operator, bearing means secured to said end walls of said tank, said bearing means being adapted to releasably receive a complementing bearing means, complementary bearing means secured to said end walls of said drum and releasably and rotatably resting in said fixed bearing means for direct manual lifting of the drum from said tank, and a motor means having an output shaft connected to one of said bearing means connected to said tank for rotating said drum.

12. The portable fish scaling apparatus of claim 11 wherein said tubular projections include circumferentially spaced groups of projections, at least one group having openings significantly larger than a second group.

13. The portable fish scaling apparatus of claim 12 wherein said tubular projections are rectangular in cross sections having an axial length significantly greater than the circumferential length.

14. The fish scaling apparatus of claim 11 having an inner scaling drum means located centrally of said scaling drum and having outward projections having an outer scale removing edge.

15. A fish scaling apparatus for removal of scales from a fish without bruising the edible body portion comprising,
a substantially closed cylindrical scaling first drum means having a cylindrical wall and end closure walls, said cylindrical wall and end closure walls, said cylindrical wall being formed of metal and having a plurality of openings including inwardly projecting sidewalls defining a plurality of fish scales removing elements, a drive shaft means on said end closure walls and adapted to be coupled to a drive means, and a secondary drum means of a substantially smaller diameter than said first drum means, and mounted to be center of said first drum means whereby the fish drop from the top portion of the first drum means onto said second drum means, said second drum means having openings with outwardly projecting sidewalls defining further scale removing elements.

16. A fish scaling apparatus of claim 15 wherein said second drum means includes first and second plate members having the longitudinal edges connected and the center of the plate members curving outwardly about the shaft means.

17. The fish scaling apparatus of claim 16 wherein second drum means is mounted on said shaft means for free floating movement about said shaft means.

18. The portable fish scaling apparatus of claim 15 wherein said motor means is a permanent magnet D.C. motor having a motor shaft integral with the motor rotor, said rotor shaft being connected to said drive means.

* * * * *

UNITED STATES PATENT AND TRADEMARK OFFICE
CERTIFICATE OF CORRECTION

PATENT NO. : 4,839,942
DATED : June 20, 1989
INVENTOR(S) : JAMES B. DAMP

It is certified that error appears in the above-identified patent and that said Letters Patent is hereby corrected as shown below:

Col. 8, line 57, delete "brusing" and substitute therefor ---bruising---;

Col. 9, line 32, after "times" insert --the diameter of--; Col. 10, line 40, after "walls" delete "said cylindrical wall and end closure walls,";

Col. 10, line 49, delete "be" and substitute therefore ---the---;

Col. 10, line 60, after "wherein" insert ---said---.

Signed and Sealed this

Thirtieth Day of April, 1991

Attest:

HARRY F. MANBECK, JR.

Attesting Officer

Commissioner of Patents and Trademarks